(12) United States Patent
Obata et al.

(10) Patent No.: US 10,828,630 B2
(45) Date of Patent: Nov. 10, 2020

(54) HONEYCOMB STRUCTURE

(71) Applicant: NGK INSULATORS, LTD., Nagoya (JP)

(72) Inventors: Shogo Obata, Nagoya (JP); Shogo Hirose, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 325 days.

(21) Appl. No.: 15/906,273

(22) Filed: Feb. 27, 2018

(65) Prior Publication Data

US 2018/0264454 A1 Sep. 20, 2018

(30) Foreign Application Priority Data

Mar. 17, 2017 (JP) .................. 2017-053691

(51) Int. Cl.
*B01J 35/04* (2006.01)
*B01J 29/06* (2006.01)
(Continued)

(52) U.S. Cl.
CPC ............ *B01J 35/04* (2013.01); *B01D 46/247* (2013.01); *B01D 46/2474* (2013.01); *B01D 53/9418* (2013.01); *B01D 53/9431* (2013.01); *B01J 29/061* (2013.01); *B01J 29/072* (2013.01); *B01D 2046/2492* (2013.01);
(Continued)

(58) Field of Classification Search
None
See application file for complete search history.

(56) References Cited

U.S. PATENT DOCUMENTS 4,835,044 A * 5/1989 Hattori .................. B01D 53/86
156/89.22
2006/0191245 A1* 8/2006 Bardon ................ F01N 3/0222
55/523
(Continued)

FOREIGN PATENT DOCUMENTS

DE 10 2015 003 4 10/2015
EP 1 669 134 A1 6/2006
(Continued)

OTHER PUBLICATIONS

Takahiro Bessho, machine translation of WO 2016/170976, Oct. 27, 2016 (Year: 2016).*

(Continued)

*Primary Examiner* — Humera N. Sheikh
*Assistant Examiner* — Mary I Omori
(74) *Attorney, Agent, or Firm* — Burr & Brown, PLLC

(57) ABSTRACT

A honeycomb structure has grooves dented inwardly from the surfaces of the partition walls along a cell direction An open width of an open end of the groove is 0.015-0.505 mm and smaller than the open width a length of one side of each of the cells with the grooves, a bottom width of a bottom of the groove is 0.01-0.5 mm and smaller than the open width, a height from the bottom of the groove to the open end is 0.01-0.05 mm, a thickness of the partition wall in a groove portion is 50 μm or more, a ratio of the number of the cells with the grooves to the number of the total cells is 80% or more, and a value obtained by subtracting the open frontal area when the grooves excluded from the open frontal area when the grooves included is 0.1-8.0%.

12 Claims, 5 Drawing Sheets

(51) Int. Cl.
  B01D 53/94 (2006.01)
  B01J 29/072 (2006.01)
  B01D 46/24 (2006.01)

(52) U.S. Cl.
  CPC .............. *B01D 2046/2496* (2013.01); *B01D 2255/20761* (2013.01); *B01D 2255/50* (2013.01); *B01D 2257/404* (2013.01)

(56) References Cited

U.S. PATENT DOCUMENTS

2009/0142543 A1* 6/2009 Suwabe ............. B01D 46/2429
  428/116
2013/0243999 A1 9/2013 Hirose et al.
2015/0273461 A1 10/2015 Kondo et al.

FOREIGN PATENT DOCUMENTS

| JP | S63-054431 U | 4/1988 | |
|----|----|----|----|
| JP | H11-333305 A | 12/1999 | |
| JP | 2006159020 A * | 6/2006 | |
| JP | 2013-223857 A1 | 10/2013 | |
| WO | WO-2016170976 A1 * | 10/2016 | .............. B01J 23/63 |

OTHER PUBLICATIONS

Seiji Ogawara, machine translation of JP 2006-159020 Abstract and Description, Jun. 22, 2006 (Year: 2006).*
German Office Action (with English translation), German Application No. 10 2018 001 790.8, dated Jul. 6, 2020 (9 pages).
Japanese Office Action (with English translation), Japanese Application No. 2017-053691, dated Sep. 8, 2020.

* cited by examiner

HONEYCOMB STRUCTURE

The present application is an application based on JP 2017-053691 filed on Mar. 17, 2017 with Japan Patent Office, the entire contents of which are incorporated herein by reference.

BACKGROUND OF THE INVENTION

Field of the Invention

The present invention relates to a honeycomb structure, and more particularly, it relates to a honeycomb structure which is suitably usable as a catalyst carrier onto which an exhaust gas purifying catalyst is to be loaded, and is capable of inhibiting rise of pressure loss when the catalyst is loaded, and has an excellent isostatic strength.

Description of the Related Art

Heretofore, there have been used honeycomb structures onto which catalyst are loaded for a purification treatment of toxic substances such as HC, CO and $NO_x$ included in exhaust gases emitted from engines of a car and the like. Such a honeycomb structure is a pillar-shaped structure including partition walls which define a plurality of cells to form through channels for the exhaust gas, and a circumferential wall which is disposed to surround a circumference of the partition walls.

In recent years, there has been the tendency that regulations on emissions of the toxic substances in the exhaust gases become strict, and to cope with such emission regulations, studies have been performed for increase of an amount of the catalyst to be loaded onto the honeycomb structure. For example, as a method of increasing the amount of the catalyst to be loaded onto the honeycomb structure, there has been suggested a technology of increasing a porosity of the partition walls and charging a larger amount of catalyst into pores of the partition walls (e.g., see Patent Document 1). Furthermore, there has been suggested another technology of inhibiting rise of pressure loss, even when a thickness of the partition walls is decreased and the amount of the catalyst to be loaded is increased.

[Patent Document 1] JP Appl. No. 2013-049662

SUMMARY OF THE INVENTION

Such a honeycomb structure having a high porosity of partition walls as described in Patent Document 1 has a capacity to such an extent that a lot of catalyst can be loaded onto inner portions of the partition walls. However, in actual, when the porosity of the partition walls is simply increased, the catalyst is not sufficiently charged into pores of the partition walls, and hence, it is necessary to take a further countermeasure such as adjustment of a pore diameter distribution of the partition walls. Consequently, in the honeycomb structure in which the porosity of the partition walls is simply high, pressure loss might rise in the case of increasing an amount of the catalyst to be loaded. Furthermore, for the purpose of charging a large amount of the catalyst into the pores of the partition walls, it is also necessary to contrive a method of loading the catalyst, and in a conventional method of loading the catalyst, it has been difficult to charge a sufficient amount of the catalyst into the pores of the partition walls.

Furthermore, in the honeycomb structure in which a thickness of the partition walls is decreased, there is the problem that the partition walls are easily deformed during manufacturing of the honeycomb structure and its isostatic strength is low.

The present invention has been developed in view of such problems of conventional technologies. An object of the present invention is to provide a honeycomb structure which is suitably usable as a catalyst carrier onto which an exhaust gas purifying catalyst is to be loaded. In particular, there is provided a honeycomb structure which is capable of inhibiting rise of pressure loss when the catalyst is loaded and which has an excellent isostatic strength.

According to the present invention, there is provided a honeycomb structure as follows.

According to a first aspect of the present invention, a honeycomb structure is provided including a pillar-shaped honeycomb structure body, the honeycomb structure body having porous partition walls arranged to surround a plurality of cells extending from a first end face to a second end face to form through channels for a fluid, and the honeycomb structure having grooves dented inwardly from the surfaces of the partition walls along a direction from the first end face toward the second end face, in the surfaces of the partition walls arranged to surround the cells, wherein in a cross section of the honeycomb structure body which is perpendicular to an extending direction of the cells, an open width a of an open end of each of the grooves in the surfaces of the partition walls is from 0.015 to 0.505 mm, a bottom width b of a bottom of the groove is from 0.01 to 0.5 mm, a height c from the bottom of the groove to the open end is from 0.01 to 0.05 mm, the open width a of the groove is larger than the bottom width b of the groove, the open width a of the groove is smaller than a length of one side of each of the cells surrounded by the partition walls having the grooves, a thickness of the partition wall in a portion in which the groove is formed is 50 μm or more, a ratio of the number of the cells surrounded by the partition walls having the grooves to the number of the plurality of cells formed in the honeycomb structure body is 80% or more, and when a ratio of an open frontal area of the first end face of the honeycomb structure body excluding the grooves is A % and a ratio of an open frontal area of the first end face of the honeycomb structure body including the grooves is B %, a value obtained by subtracting the open frontal area A % from the open frontal area B % is from 0.1 to 8.0%.

According to a second aspect of the present invention, the honeycomb structure according to the above first aspect is provided, wherein in the cross section of the honeycomb structure body which is perpendicular to the extending direction of the cells, a shape of the cells is polygonal, and the honeycomb structure has at least one of the grooves in each of the surfaces of the partition walls constituting respective sides of a polygonal cell.

According to a third aspect of the present invention, the honeycomb structure according to the above second aspect is provided, having two or more grooves in the surface of the partition wall constituting at least one of the respective sides of the cell, wherein the two or more grooves are arranged at equal intervals in the surface of the partition wall constituting the one side.

According to a fourth aspect of the present invention, the honeycomb structure according to any one of the above first to third aspects is provided, wherein a thickness of the partition wall in the portion having the groove is 0.5 times or more as large as a thickness of the partition wall in a portion which does not have the groove.

According to a fourth aspect of the present invention, the honeycomb structure according to any one of the above first to fourth aspects is provided, wherein an exhaust gas purifying catalyst is loaded onto the surfaces of the partition walls, to fill the grooves of the partition walls.

A honeycomb structure of the present invention produces the effect that the honeycomb structure is capable of inhibiting rise of pressure loss when a catalyst is loaded, and has an excellent isostatic strength. That is, when the honeycomb structure of the present invention is utilized as a catalyst carrier onto which an exhaust gas purifying catalyst is to be loaded, the exhaust gas purifying catalyst is suitably stored in grooves of the surfaces of partition walls, and even when an amount of the catalyst to be loaded is increased, it is possible to effectively inhibit the rise of the pressure loss. Furthermore, when an open width a, a bottom width b, a height c and the like of the groove provided in the surface of the partition wall are adjusted in the above-mentioned numeric ranges, it is also possible to effectively inhibit deterioration of the isostatic strength while inhibiting the rise of the pressure loss.

DESCRIPTION OF THE PREFERRED EMBODIMENTS

Figure 1:
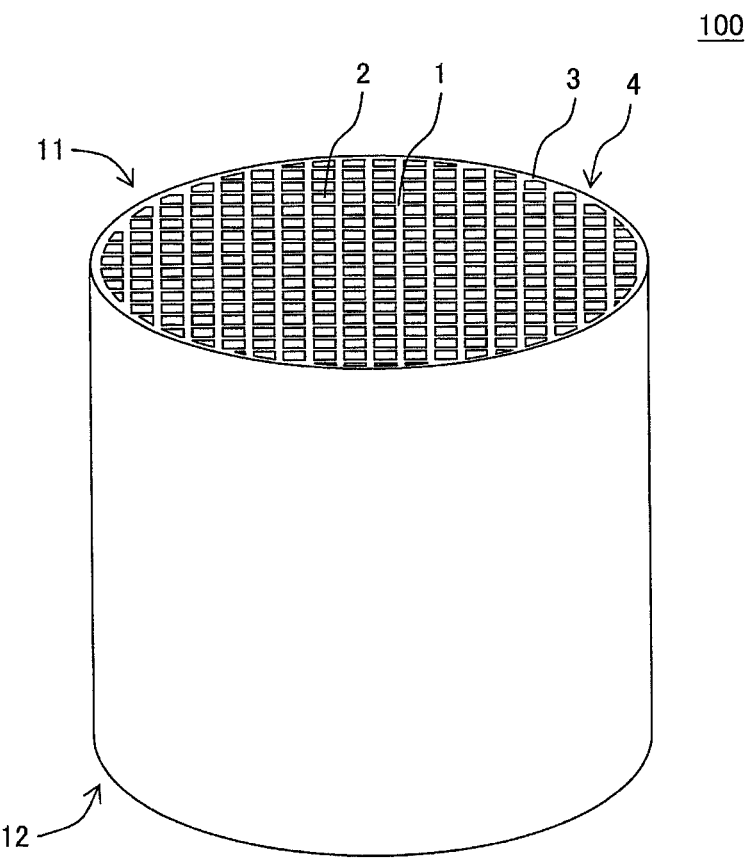
FIG. 1 is a perspective view schematically showing one embodiment of a honeycomb structure of the present invention.

Hereinafter, description will be made as to embodiments of the present invention. However, the present invention is not limited to the following embodiments. Therefore, it should be understood that modifications, improvements and the like are addable to the following embodiments on the basis of ordinary knowledge of a person skilled in the art without departing from the gist of the present invention.

(1) Honeycomb Structure:

One embodiment of a honeycomb structure of the present invention is such a honeycomb structure 100 as shown in FIG. 1 to FIG. 4. The honeycomb structure 100 includes a pillar-shaped honeycomb structure body 4. Furthermore, the honeycomb structure body 4 has porous partition walls 1 arranged to surround a plurality of cells 2 extending from a first end face 11 to a second end face 12 to form through channels for a fluid.

Figure 2:
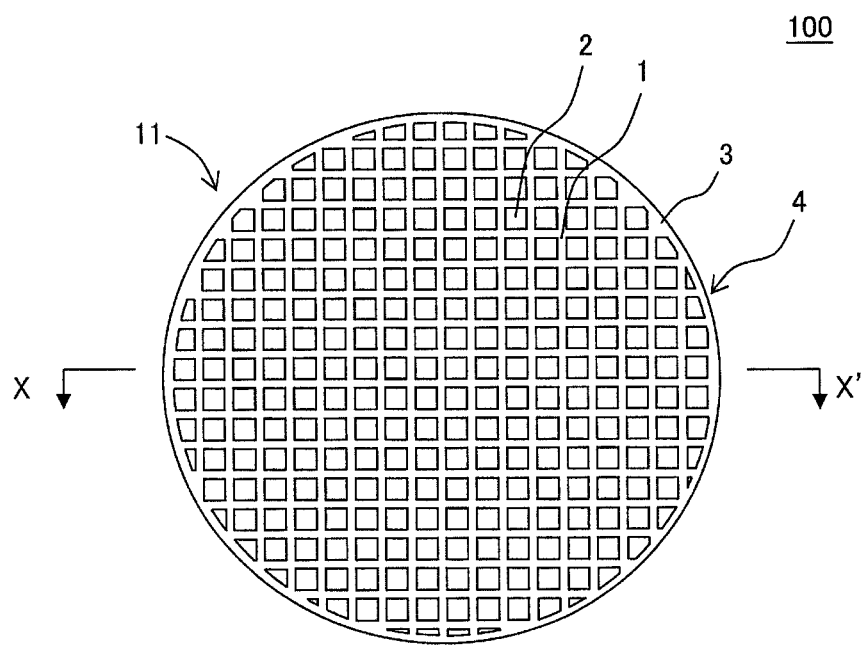
FIG. 2 is a plan view schematically showing a first end face of the honeycomb structure shown in FIG. 1.
Figure 3:
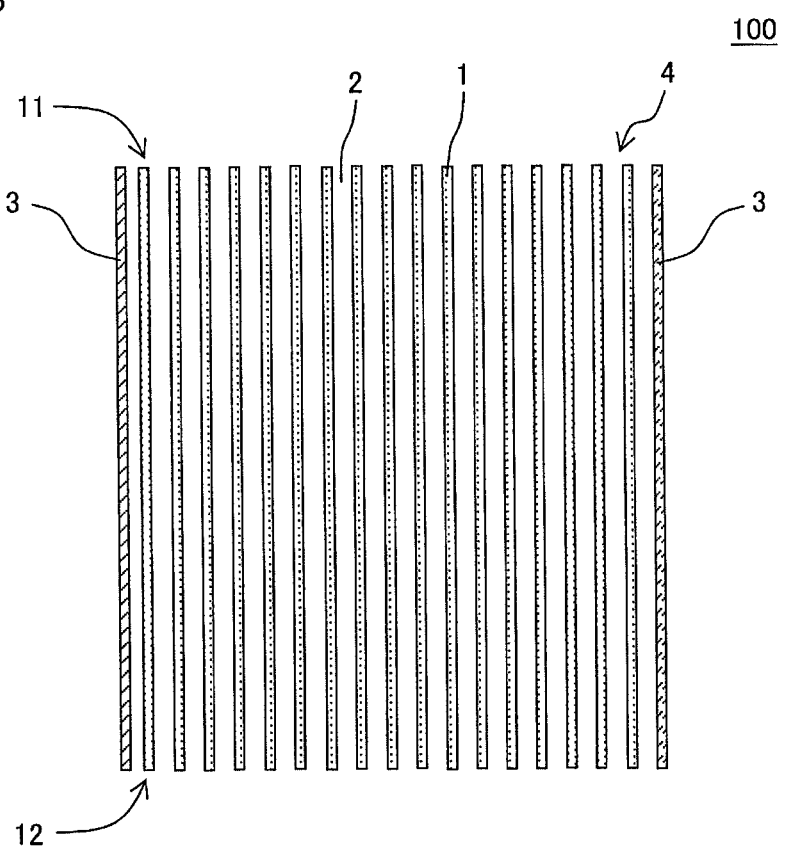
FIG. 3 is a cross-sectional view schematically showing a cross section taken along the X-X' line of FIG. 2.
Figure 4:
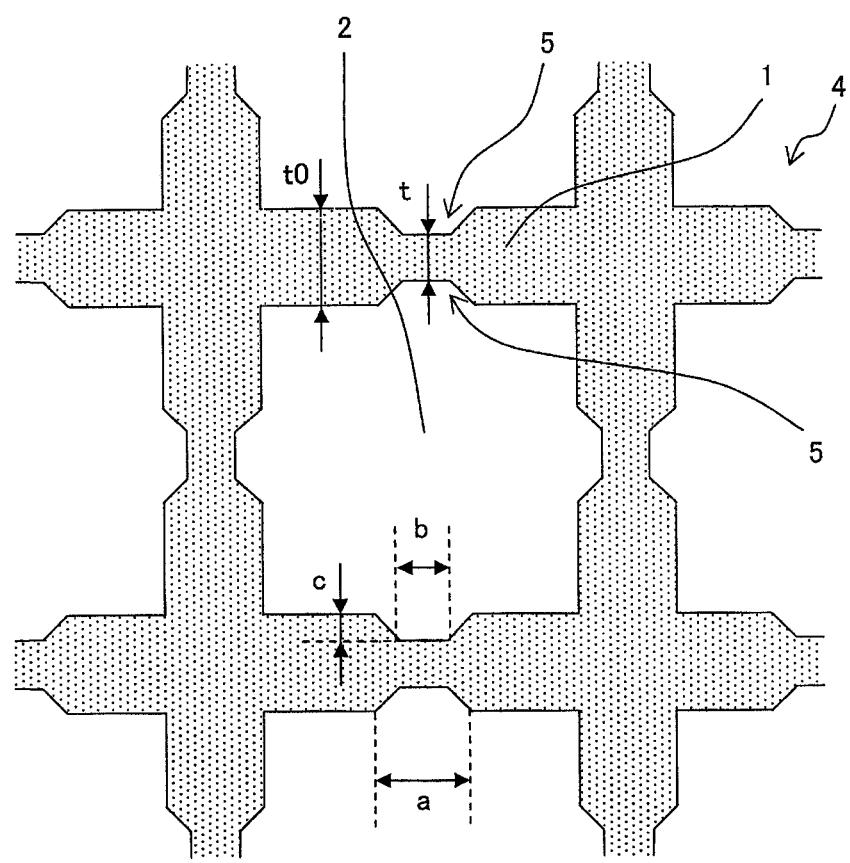
FIG. 4 is an enlarged plan view showing an enlarged part of the honeycomb structure shown in FIG. 2, to explain constitutions of partition walls and cells.

Here, FIG. 1 is a perspective view schematically showing one embodiment of the honeycomb structure of the present invention. FIG. 2 is a plan view schematically showing the first end face of the honeycomb structure shown in FIG. 1. FIG. 3 is a cross-sectional view schematically showing a cross section taken along the X-X' line of FIG. 2. FIG. 4 is an enlarged plan view showing an enlarged part of the honeycomb structure shown in FIG. 2, to explain constitutions of the partition walls and the cells.

The honeycomb structure 100 of the present embodiment has grooves 5 dented inwardly from the surfaces of the partition walls 1 in the surfaces of the partition walls 1 of the honeycomb structure body 4. That is, the honeycomb structure has the grooves 5 dented inwardly from the surfaces of the partition walls 1 along a direction from the first end face 11 toward the second end face 12, in the surfaces of the partition walls 1 arranged to surround the cells 2.

Furthermore, the honeycomb structure 100 of the present embodiment has especially major characteristics that the grooves 5 formed in the surfaces of the partition walls 1 have the following constitutions. Initially, in a cross section of the honeycomb structure body 4 which is perpendicular to an extending direction of the cells 2 (e.g., see FIG. 4), an open width a of an open end of each of the grooves 5 in the surfaces of the partition walls 1 is from 0.015 to 0.505 mm. Additionally, in this cross section, a bottom width b of a bottom of the groove 5 is from 0.01 to 0.5 mm. Further in this cross section, a height c from the bottom of the groove 5 to the open end thereof is from 0.01 to 0.05 mm.

Additionally, the open width a of the groove 5 is larger than the bottom width b of the groove 5. The open width a of the groove 5 is smaller than a length of one side of each of the cells 2 surrounded by the partition walls 1 having the grooves 5. In addition, a thickness t of the partition wall 1 in a portion in which the groove 5 is formed is 50 μm or more.

In addition, a ratio of the number of the cells 2 surrounded by the partition walls 1 having the grooves 5 to the number of the plurality of cells 2 formed in the honeycomb structure body 4 is 80% or more. It is to be noted that in the honeycomb structure 100 of the present embodiment, the cell 2 means a space surrounded by the partition walls 1.

Furthermore, when a ratio of an open frontal area of the first end face 11 of the honeycomb structure body 4 excluding the grooves 5 is A % and a ratio of an open frontal area of the first end face 11 of the honeycomb structure body 4 including the grooves 5 is B %, a value obtained by subtracting the open frontal area A % from the open frontal area B % is from 0.1 to 8.0%.

The honeycomb structure 100 having the above-mentioned constitution produces the effect that the honeycomb structure is capable of inhibiting rise of pressure loss when a catalyst is loaded, and has an excellent isostatic strength. That is, when the honeycomb structure 100 is utilized as a catalyst carrier onto which an exhaust gas purifying catalyst is to be loaded, the exhaust gas purifying catalyst is suitably stored in the grooves 5 of the surfaces of the partition walls 1, and even when an amount of the catalyst to be loaded is increased, it is possible to effectively inhibit the rise of the pressure loss. Furthermore, when the open width a, the bottom width b, the height c and the like of the groove 5 provided in the surface of the partition wall 1 are adjusted in the above-mentioned numeric ranges, it is also possible to effectively inhibit deterioration of the isostatic strength while inhibiting the rise of the pressure loss.

The open width a, the bottom width b and the height c of the groove 5 in the surface of the partition wall 1 are obtainable by measuring the cross section of the honeycomb structure body 4 which is perpendicular to the extending direction of the cells 2, for example, with an image analysis device ("NEXIV, VMR-1515 (tradename)" manufactured by Nikon Corporation). Specifically, a method of measuring the open width a, the bottom width b and the height c is as follows. Initially, the honeycomb structure body 4 is cut in the direction perpendicular to the extending direction of the cells 2, to cut out cross sections of the honeycomb structure body 4. The cross sections to be cut out are three cross sections including the cross section on the side of the first end face 11 (e.g., an inflow end face side), the cross section on the side of the second end face 12 (e.g., an outflow end face side) and the cross section of an intermediate portion between the sides. Then, as to each of the cells 2 in the respective cross sections, it is confirmed whether or not the honeycomb structure has the grooves 5 in the surfaces of the partition walls 1 surrounding the cell 2. When the honeycomb structure has the grooves 5 in the surfaces of the partition walls 1, the open width a, the bottom width b and the height c of each of the grooves 5 are measured.

In the honeycomb structure 100 of the present embodiment, one groove 5 is continuously formed along the direction from the first end face 11 toward the second end face 12 in the honeycomb structure body 4. Furthermore, it is preferable that the groove 5 has about the same shape along the direction from the first end face 11 toward the second end face 12 in the honeycomb structure body 4.

When the open width a of the groove 5 is less than 0.015 mm, the pressure loss of the honeycomb structure 100 easily rises. Furthermore, when the open width a of the groove 5 is in excess of 0.505 mm, the isostatic strength of the honeycomb structure 100 deteriorates. The open width a of the groove 5 is preferably from 0.050 to 0.450 mm and further preferably from 0.100 to 0.400 mm.

When the bottom width b of the groove 5 is less than 0.01 mm or in excess of 0.5 mm, the pressure loss of the honeycomb structure 100 easily rises. The bottom width b of the groove 5 is preferably from 0.050 to 0.450 mm and further preferably from 0.100 to 0.400 mm.

When the height c of the groove 5 is less than 0.01 mm, the pressure loss of the honeycomb structure 100 easily rises. Furthermore, when the height c of the groove 5 is in excess of 0.05 mm, the isostatic strength of the honeycomb structure 100 deteriorates. The height c of the groove 5 is preferably from 0.020 to 0.040 mm and further preferably from 0.030 to 0.040 mm.

The open width a of the groove 5 is larger than the bottom width b of the groove 5, and for example, the open width a is preferably from 1.1 to 1.8 times and further preferably from 1.5 to 1.8 times as large as the bottom width b. According to such a constitution, it is possible to suitably store the exhaust gas purifying catalyst in the grooves 5.

The open width a of the groove 5 is smaller than a length L of one side of each of the cells 2 surrounded by the partition walls 1 in which the grooves 5 are formed. When the open width a of the groove 5 is in excess of the length L of the side of the cell 2, the partition wall 1 unfavorably has a cut shape. For example, a ratio of the open width a to the length L of the side of the cell 2 is preferably from 10 to 50% and further preferably from 20 to 40%. Here, "the length L of the side of the cell 2 surrounded by the partition walls 1" is the length L of one side of the cell 2 constituted by the partition walls 1, when a shape of the cell 2 surrounded by the partition walls 1 is polygonal. Furthermore, when the shape of the cell 2 is a polygonal shape in which corners are rounded, or the like, a length of a straight portion of the polygonal shape excluding a rounded portion or the like is the length L of the side of the cell 2.

It is preferable that the bottom width b of the groove 5 is smaller than a hydraulic diameter of the cell 2 surrounded by the partition walls 1 in which the grooves 5 are formed. According to such a constitution, it is possible to effectively inhibit the deterioration of the isostatic strength of the honeycomb structure 100. The hydraulic diameter of the cell 2 is a value calculated in 4×(a sectional area)/(a peripheral length) on the basis of the sectional area and peripheral length of each cell 2.

Figure 5:
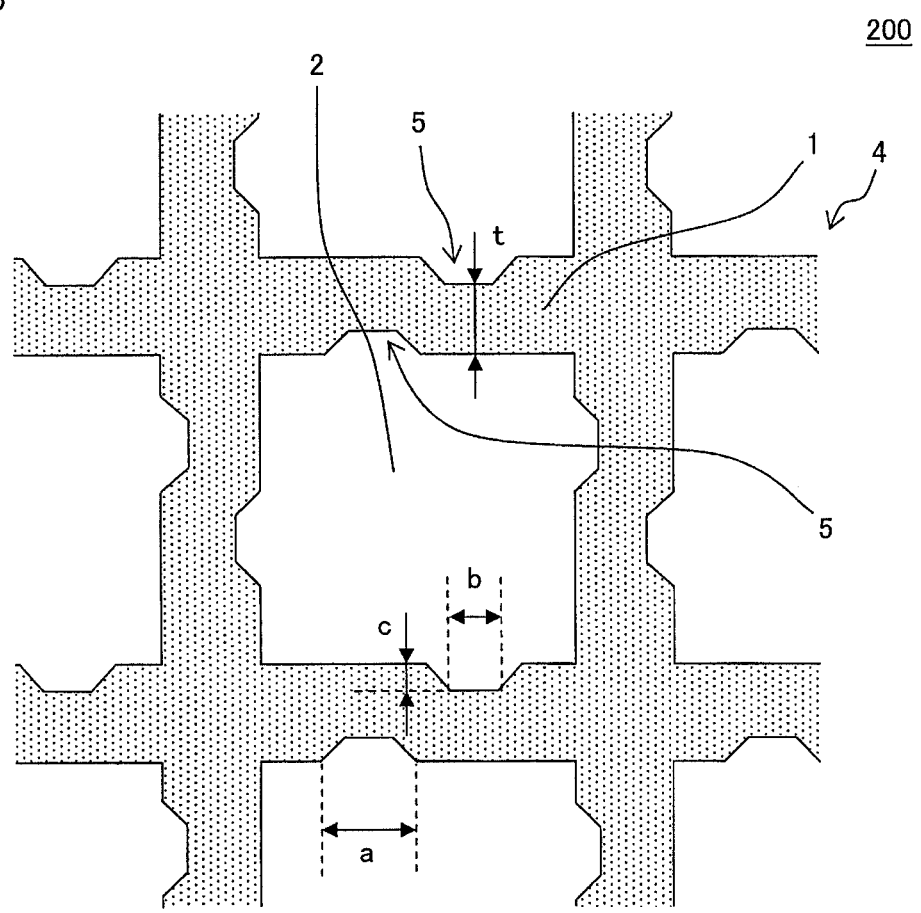
FIG. 5 is an enlarged plan view schematically showing a first end face of another embodiment of the honeycomb structure of the present invention, to explain constitutions of partition walls and cells.

The thickness t of the partition wall 1 in the portion in which the groove 5 is formed is 50 μm or more. As shown in FIG. 4, when the groove 5 is formed at the same position in each of front and back surfaces of the partition wall 1, the thickness t of the partition wall 1 is a distance from the bottom of one groove 5 to the bottom of the other groove 5. On the other hand, when grooves 5 are formed at different positions in front and back surfaces of one partition wall 1 as in a honeycomb structure 200 shown in FIG. 5, a thickness t of a partition wall 1 is a distance from a bottom of one groove 5 to an opposite surface of the partition wall 1. FIG. 5 is an enlarged plan view schematically showing a first end face of another embodiment of the honeycomb structure of the present invention, to explain constitutions of partition walls and cells.

In the honeycomb structure 100 shown in FIG. 4, when the thickness t of the partition wall 1 in the portion in which the groove 5 is formed is less than 50 μm, the isostatic strength of the honeycomb structure 100 deteriorates. The thickness t of the partition wall 1 in the portion in which the groove 5 is formed is preferably from 50 to 70 μm and further preferably from 60 to 70 μm.

As described above, the ratio of the number of the cells 2 surrounded by the partition walls 1 having the grooves 5 to the number of the plurality of cells 2 formed in the honeycomb structure body 4 is 80% or more. It is to be noted that "the cell 2 surrounded by the partition walls 1 having the grooves 5" indicates "the cell 2 constituted so that the partition walls 1 each having at least one groove 5 in the surface on a side to surround the cell 2 are arranged in a periphery of the cell 2". Hereinafter, the above "number ratio" will occasionally be referred to as "the number ratio of the cells having the grooves". When the number ratio of the cells having the grooves is less than 80%, the pressure loss of the honeycomb structure 100 easily rises. The number ratio of the cells having the grooves is preferably from 80 to 100% and further preferably from 90 to 100%.

As described above, when the ratio of the open frontal area of the first end face 11 of the honeycomb structure body 4 excluding the grooves 5 is A % and the ratio of the open frontal area of the first end face 11 of the honeycomb structure body 4 including the grooves 5 is B %, the value obtained by subtracting the open frontal area A % from the open frontal area B % is from 0.1 to 8.0%. It is to be noted that "the open frontal area A % of the first end face 11 excluding the grooves 5" is the open frontal area of the first end face 11 which is calculated when it is supposed that the grooves 5 formed in the surfaces of the partition walls 1 are closed. Therefore, the open frontal area A % is calculated as a ratio of an open frontal area S2 only of the cells 2 excluding the grooves 5 to a total area S1 of the honeycomb structure body 4 surrounded by a circumferential wall 3 in S2/S1×100%. Here, the total area S1 includes an area of the circumferential wall 3 disposed at a circumference of the honeycomb structure body 4. Furthermore, "the open frontal area B % of the first end face 11 including the grooves 5" is the open frontal area of the first end face 11 which is calculated when the grooves 5 formed in the surfaces of the partition walls 1 are included in open portions of the honeycomb structure body 4. Therefore, the open frontal area B % is calculated as a ratio of a sum of the open frontal area S2 of the cells 2 and open areas S3 of the grooves 5 to the total area S1 of the honeycomb structure body 4 surrounded by the circumferential wall 3 in (S2+S3)/S1×100%.

Hereinafter, the value obtained by subtracting the open frontal area A % from the open frontal area B % will occasionally be referred to as "a difference between the open frontal area A % and the open frontal area B %". When the difference between the open frontal area A % and the open frontal area B % is less than 0.1%, the pressure loss of the honeycomb structure 100 easily rises. When the difference between the open frontal area A % and the open frontal area B % is in excess of 8.0%, the isostatic strength of the honeycomb structure 100 deteriorates. The difference between the open frontal area A % and the open frontal area B % is preferably from 1.0 to 7.0% and further preferably from 3.0 to 6.0%.

According to the honeycomb structure 100 of the present embodiment, as shown in FIG. 4, it is preferable that the shape of the cells 2 is polygonal in the cross section of the honeycomb structure body 4 which is perpendicular to the extending direction of the cells 2. "The shape of the cell 2" means the shape of the cell 2 which does not include a shape of each of the grooves 5 formed in the surfaces of the partition walls 1. There are not any special restrictions on the shape of the cell 2 in a face perpendicular to the extending direction of the cells 2. Examples of the shape of the cell 2 include a triangular shape, a quadrangular shape, a hexagonal shape, an octagonal shape and any combination of these shapes. It is to be noted that when the shape of the cell 2 is polygonal, the shape includes a shape in which at least one of the corners of the polygonal shape is formed in a curved shape, and a shape in which at least one of the corners of the polygonal shape is linearly chamfered.

Figure 7:
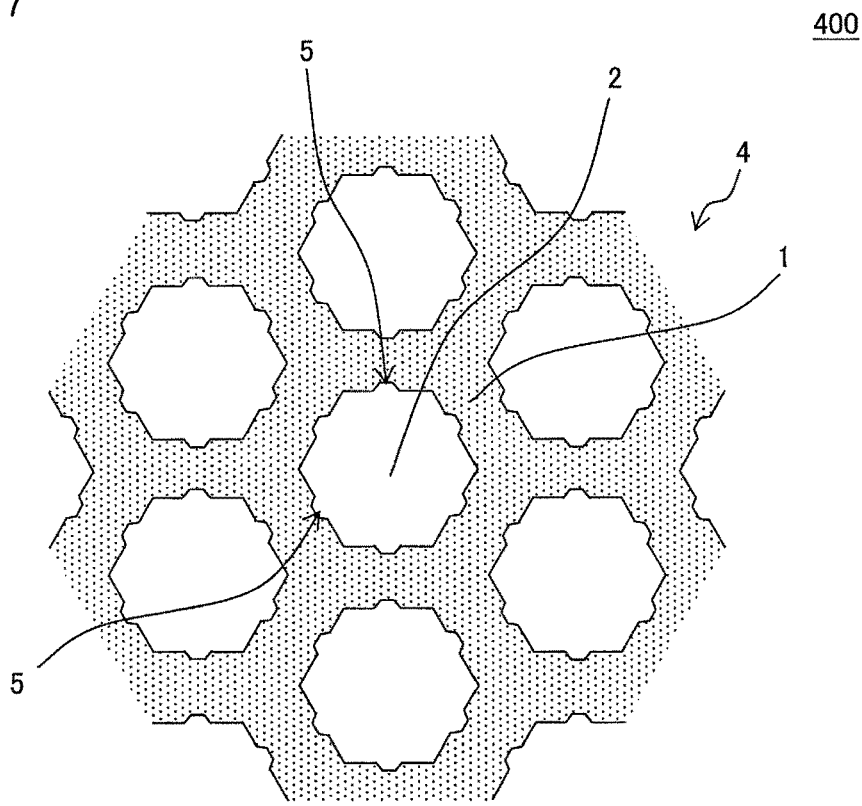
FIG. 7 is an enlarged plan view schematically showing a first end face of a further embodiment of the honeycomb structure of the present invention, to explain constitutions of partition walls and cells.

In a honeycomb structure 400 shown in FIG. 7, a shape of cells 2 is hexagonal in a face perpendicular to an extending direction of the cells 2. The honeycomb structure 400 has grooves 5 dented inwardly from the surfaces of partition walls 1, in the surfaces of the partition walls 1 of a honeycomb structure body 4. Furthermore, a shape of the grooves 5 is constituted to satisfy the respective conditions hitherto mentioned. FIG. 7 is an enlarged plan view schematically showing a first end face of still another embodiment of the honeycomb structure of the present invention, to explain constitutions of the partition walls and the cells.

As shown in FIG. 4, when the shape of the cells 2 is polygonal, it is preferable that the honeycomb structure has at least one groove 5 in each of the surfaces of the partition walls 1 constituting the respective sides of one polygonal cell 2. According to such a constitution, it is possible to effectively inhibit the deterioration of the isostatic strength while inhibiting the rise of the pressure loss.

Figure 6:
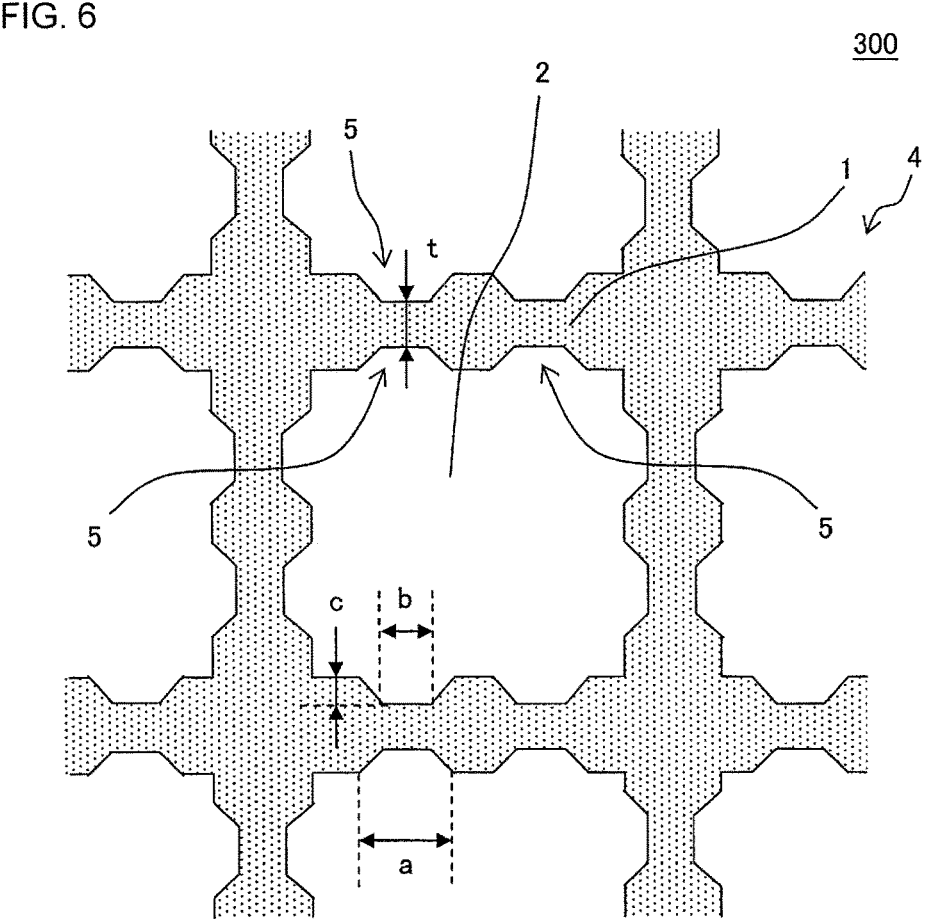
FIG. 6 is an enlarged plan view schematically showing a first end face of still another embodiment of the honeycomb structure of the present invention, to explain constitutions of partition walls and cells.

Furthermore, when a shape of cells 2 is polygonal as in a honeycomb structure 300 shown in FIG. 6, two grooves 5 and 5 or more may be formed in the surface of a partition wall 1 constituting each side of one polygonal cell 2. The two or more grooves 5 are formed, so that, for example, a value of the above-mentioned "difference between the open frontal area A % and the open frontal area B %" is adjustable. It is to be noted that when the two grooves 5 and 5 or more are formed in the surface of the partition wall 1, it is further preferable that the two grooves 5 and 5 or more are arranged at equal intervals in the surface of the partition wall 1 constituting the one side. FIG. 6 is an enlarged plan view schematically showing a first end face of a still further embodiment of the honeycomb structure of the present invention, to explain constitutions of the partition walls and the cells.

It is preferable that, as shown in FIG. 4, the thickness t of the partition wall 1 in the portion having the groove 5 is 0.5 times or more as large as a thickness t0 of the partition wall 1 in a portion which does not have the groove 5. According to such a constitution, it is also possible to effectively inhibit the deterioration of the isostatic strength. The thickness t of the partition wall 1 in the portion having the groove 5 is further preferably from 0.5 to 0.9 times and especially preferably from 0.6 to 0.8 times as large as the thickness t0 of the partition wall 1 in the portion which does not have the groove 5.

It is preferable that the thickness t0 of the partition wall 1 in the portion which does not have the groove 5 is from 0.089 to 0.305 mm. When the thickness t0 of the partition wall 1 is smaller than 0.089 mm, strength of the honeycomb structure 100 might deteriorate. When the thickness t0 of the partition wall 1 is larger than 0.305 mm, the pressure loss of the honeycomb structure 100 might increase. Hereinafter, "the thickness of the partition wall 1 in the portion which does not have the groove 5" will occasionally be referred to simply as "the thickness of the partition walls 1".

It is preferable that a porosity of the partition walls 1 is from 30 to 55%. When the porosity of the partition walls 1 is less than 30%, the pressure loss of the honeycomb structure 100 might increase. When the porosity of the partition walls 1 is in excess of 55%, the isostatic strength of the honeycomb structure 100 might deteriorate. The porosity of the partition walls 1 is a value measured with a mercury porosimeter. An example of the mercury porosimeter is AutoPore 9500 (tradename) manufactured by Micromeritics Instrument Corp.

It is preferable that a cell density of the honeycomb structure 100 is, for example, from 31 to 93 cells/cm$^2$. When the cell density is less than 31 cells/cm$^2$ and when the honeycomb structure 100 is used as the catalyst carrier onto which the exhaust gas purifying catalyst is to be loaded, an area to perform an exhaust gas purification treatment decreases, and a sufficient purification performance might not be exerted. On the other hand, when the cell density is in excess of 93 cells/cm$^2$, the pressure loss of the honeycomb structure 100 might increase.

An example of an overall shape of the honeycomb structure 100 is a pillar shape in which a shape of each end face is round or oval. When the honeycomb structure 100 has the round pillar shape, an example of a size of the honeycomb structure is a diameter of a bottom surface which is preferably from 55.0 to 330.2 mm. Furthermore, it is preferable that a length of the honeycomb structure 100 in a central axis direction is from 50.0 to 280.0 mm.

There are not any special restrictions on a material of the partition walls 1. An example of the material of the partition walls 1 is a material containing ceramic as a main component. A suitable example of ceramic is a material containing at least one selected from the group consisting of cordierite, silicon carbide, a silicon-silicon carbide based composite material, mullite, alumina, silicon nitride, a cordierite forming raw material, lithium aluminum silicate, aluminum titanate, and a silicon carbide-cordierite based composite material. When the material "contains ceramic as the main component", it is meant that ceramic is contained as much as 50 mass % or more in the whole material.

The honeycomb structure of the present embodiment is suitably usable as the catalyst carrier onto which the exhaust gas purifying catalyst is to be loaded. In the honeycomb structure of the present embodiment, although omitted from the drawings, the exhaust gas purifying catalyst may be loaded onto the surfaces of the partition walls, to fill the grooves of the partition walls. It is to be noted that the exhaust gas purifying catalyst may not only be loaded onto the surfaces of the partition walls but also be charged into pores formed in the partition walls. Examples of a type of catalyst include an SCR catalyst, a $NO_x$ absorber catalyst, and an oxidation catalyst, and particularly, the SCR catalyst is preferable. The "SCR" is an abbreviation for the "selective catalytic reduction". "The SCR catalyst" means a catalyst to selectively reduce components to be purified by a reduction reaction.

(2) Manufacturing Method of Honeycomb Structure:

Next, description will be made as to a method of manufacturing the honeycomb structure of the present invention.

Initially, a plastic kneaded material to prepare partition walls is prepared. A method of preparing the kneaded material can be performed in conformity with the heretofore known manufacturing method of the honeycomb structure.

Next, the prepared kneaded material is extruded to obtain a pillar-shaped honeycomb formed body having partition walls defining a plurality of cells. In the extrusion, an extruding die is usable in which slits having an inverted shape of the honeycomb formed body to be formed are formed in a kneaded material extruding surface. For example, it is preferable that the slits of the die are formed in a latticed manner in the surface of the die, to form the grooves having a desirable shape in the surfaces of the partition walls. Furthermore, the obtained honeycomb formed body may be dried, for example, with microwaves and hot air.

Next, the obtained honeycomb formed body is fired, thereby obtaining the honeycomb structure including the honeycomb structure body having the porous partition walls. Firing temperature and firing atmosphere vary in accordance with the material used in the preparation of the honeycomb formed body, and the person skilled in the art can select the firing temperature and firing atmosphere which are most suitable for the selected material.

EXAMPLES

Hereinafter, the present invention will further specifically be described in accordance with examples, but the present invention is not limited to these examples.

Example 1

To 100 parts by mass of cordierite forming raw material, 0.1 to 2 parts by mass of dispersing medium and 1 to 10 parts by mass of organic binder were added, mixed and kneaded to prepare a kneaded material for extrusion. As the cordierite forming raw material, alumina, aluminum hydroxide, kaolin, talc and silica were used. Water was used as the dispersing medium, starch was used as a pore former, hydroxypropyl methylcellulose was used as the organic binder, and ethylene glycol was used as a dispersing agent.

Next, the kneaded material was extruded by using a honeycomb formed body preparing die, and a honeycomb formed body whose overall shape was a round pillar shape was obtained.

Then, the honeycomb formed body was dried with a microwave drier, and further completely dried with a hot air drier. Afterward, both end faces of the honeycomb formed body were cut to adjust a dimension of the honeycomb formed body to a predetermined dimension.

Next, the dried honeycomb formed body was degreased and fired, thereby obtaining a honeycomb structure of Example 1. The obtained honeycomb structure was constituted of a honeycomb structure body having porous partition walls arranged to surround a plurality of cells. Furthermore, the honeycomb structure of Example 1 had grooves dented inwardly from the surfaces of the partition walls along a direction from a first end face toward a second end face, in the surfaces of the partition walls arranged to surround the cell.

The honeycomb structure of Example 1 had a round pillar shape in which a diameter of each end face was 143.8 mm, and a length in a cell extending direction was 152.4 mm. A thickness of the partition walls was 0.114 mm. A shape of the cell surrounded by the partition walls was quadrangular, and a cell density was 62 cells/cm$^2$. In the shape of the cell, a length of its side was 1.259 mm. Table 1 shows the thickness of the partition walls and the cell density in a column of "cell structure". Furthermore, a porosity of the partition walls was 35%. The porosity was measured with AutoPore 9500 (tradename) manufactured by Micromeritics Instrument Corp. Table 1 shows the result.

TABLE 1

| | Cell structure | | | | Dimension of groove | | | Open frontal area A which does not include grooves (%) | Open frontal area B including grooves (%) | Difference between open frontal area A and open frontal area B (B − A) (%) | Number ratio of cells having grooves (%) |
|---|---|---|---|---|---|---|---|---|---|---|---|
| | Partition wall thickness (mm) | Cell density (cells/cm$^2$) | Porosity (%) | No. of grooves per cell (grooves) | a (mm) | b (mm) | c (mm) | | | | |
| Example 1 | 0.114 | 62 | 35 | 1 | 0.25 | 0.23 | 0.03 | 82.8% | 83.3% | 0.45% | 97% |
| Example 2 | 0.114 | 62 | 35 | 5 | 0.26 | 0.21 | 0.03 | 82.8% | 85.0% | 2.2% | 81% |
| Example 3 | 0.114 | 62 | 35 | 10 | 0.24 | 0.22 | 0.02 | 82.8% | 85.7% | 2.9% | 98% |
| Example 4 | 0.114 | 62 | 35 | 5 | 0.5 | 0.25 | 0.03 | 82.8% | 86.3% | 3.5% | 89% |
| Example 5 | 0.114 | 62 | 35 | 5 | 0.016 | 0.01 | 0.03 | 82.8% | 82.9% | 0.1% | 92% |
| Example 6 | 0.114 | 62 | 35 | 5 | 0.49 | 0.44 | 0.03 | 82.8% | 87.1% | 4.3% | 88% |
| Example 7 | 0.114 | 62 | 35 | 5 | 0.25 | 0.011 | 0.03 | 82.8% | 84.0% | 1.2% | 93% |

TABLE 1-continued

| | Cell structure | | | | | | | Open frontal area A which does not include grooves (%) | Open frontal area B including grooves (%) | Difference between open frontal area A and open frontal area B (B − A) (%) | Number ratio of cells having grooves (%) |
|---|---|---|---|---|---|---|---|---|---|---|---|
| | Partition wall thickness (mm) | Cell density (cells/cm²) | Porosity (%) | No. of grooves per cell (grooves) | Dimension of groove | | | | | | |
| | | | | | a (mm) | b (mm) | c (mm) | | | | |
| Example 8 | 0.114 | 62 | 35 | 5 | 0.28 | 0.23 | 0.049 | 82.8% | 86.7% | 3.9% | 86% |
| Example 9 | 0.114 | 62 | 35 | 5 | 0.21 | 0.18 | 0.025 | 82.8% | 84.3% | 1.5% | 94% |
| Example 10 | 0.305 | 31 | 35 | 5 | 0.23 | 0.19 | 0.04 | 68.9% | 70.2% | 1.3% | 88% |
| Example 11 | 0.089 | 93 | 35 | 5 | 0.26 | 0.2 | 0.015 | 83.6% | 85.2% | 1.6% | 92% |

In the honeycomb structure of Example 1, the number of the grooves was 1 to the partition walls surrounding one cell. Specifically, among the partition walls constituting four sides surrounding a periphery of a quadrangular cell, only one partition wall constituting one side had one groove. As to the honeycomb structure having such a constitution, Table 1 shows 1 (groove) in a column of "the number of the grooves per cell (grooves)". It is to be noted that, for example, when the number of the grooves is 5 to the partition walls surrounding one cell, the table shows 5 (grooves) in the column.

In the groove, an open width a was 0.25 mm, a bottom width b was 0.23 mm, and a height c was 0.03 mm. Furthermore, a ratio of the number of the cells having the grooves was 97%. It is to be noted that "the number ratio of the cells having the grooves" is the ratio of the number of the cells surrounded by the partition walls having the grooves to the number of the plurality of cells. Furthermore, an open frontal area A (%) which did not include the grooves was 82.8% and an open frontal area B (%) including the grooves was 83.3%. A difference between the open frontal area A and the open frontal area B was 0.45%. Table 1 shows the above-mentioned respective results.

As to the honeycomb structure of Example 1 obtained in this manner, a catalyst was loaded onto the surfaces of the partition walls. A catalyst species of this catalyst was copper zeolite and an amount of the catalyst to be loaded was 175 g/L. The copper zeolite is a metal-substituted zeolite, and particularly, a metal in the metal-substituted zeolite is copper (Cu). The amount of the catalyst to be loaded is a mass of the catalyst loaded per unit volume of the honeycomb structure (i.e., per liter of a volume).

As to the honeycomb structure onto which the catalyst was loaded, evaluations of "a $NO_x$ purification ratio (%)" and "an isostatic strength (MPa)" were carried out by the following methods. Furthermore, pressure loss of the honeycomb structure onto which the catalyst was loaded was measured, and evaluation of "pressure loss comparison (%)" was carried out by the following method. Table 2 shows the result.

($NO_x$ Purification Ratio (%))

Initially, a testing gas containing $NO_x$ was passed through the honeycomb structure. Afterward, an amount of $NO_x$ in the gas emitted from this honeycomb structure was analyzed with a gas analyzer.

A temperature of the testing gas to flow into the honeycomb structure was set at 200° C. Additionally, temperatures of the honeycomb structure and the testing gas were adjusted with a heater. As the heater, an infrared image furnace was used. There was used the testing gas obtained by mixing nitrogen with 5 vol % of carbon dioxide, 14 vol % of oxygen, 350 ppm of nitrogen monoxide (a volume basis), 350 ppm of ammonia (a volume basis) and 10 vol % of water. Concerning this testing gas, water and a mixed gas obtained by mixing the other gases were separately prepared, and were mixed in a pipe for use in carrying out a test. The gas analyzer "MEXA9100EGR manufactured by HORIBA, Ltd." was used. Furthermore, a space velocity when the testing gas flowed into the honeycomb structure was set to 100,000 ($h^{-1}$). "The $NO_x$ purification ratio" is a value (unit:%) obtained by dividing, by an amount of $NO_x$ in the testing gas, a value obtained by subtracting the amount of $NO_x$ in the gas emitted from the honeycomb structure from the amount of $NO_x$ in the testing gas, and then multiplying the obtained value by 100. When "the $NO_x$ purification ratio was 75% or more, an evaluation result was "pass", and when the ratio was less than 75%, the result was "failure".

(Isostatic Strength (MPa))

Measurement of the isostatic strength was carried out on the basis of an isostatic breakdown strength test stipulated in M505-87 of a car standard (JASO Standard) issued by the society of Automotive Engineers of Japan. In the isostatic breakdown strength test, the honeycomb structure was placed in a rubber tubular container, the container was closed with a lid of an aluminum plate, and isotropic pressurizing compression was performed in water.

In other words, the isostatic breakdown strength test was a test to simulate compressive load weighting when a circumferential surface of the honeycomb structure was grasped in a can member. The isostatic strength measured by this isostatic breakdown strength test is indicated with a pressurizing pressure value (MPa) when the honeycomb structure breaks down. When the isostatic strength was 1.0 MPa or more, an evaluation result was "pass", and when the isostatic strength was less than 1.0 MPa, the result was "failure".

(Pressure Loss Comparison (%))

Air was passed through the honeycomb structure at a flow velocity of 10 m³/min under room temperature conditions, and a pressure on an inlet side of the honeycomb structure and a pressure on an outlet side thereof were measured. A pressure difference between the pressure on the inlet side and the pressure on the outlet side was obtained as pressure loss (kPa) of the honeycomb structure of a measurement object. Furthermore, also as to a honeycomb structure of Comparative Example 1 which did not have any grooves in the surfaces of partition walls, pressure loss (kPa) was measured by a similar method. A percentage (%) of a ratio of the pressure loss (kPa) of the honeycomb structure of the measurement object to the pressure loss (kPa) of the honeycomb structure of the Comparative Example 1 was calculated. The calculated value was evaluated as an evaluation value of the pressure loss comparison (%) in accordance with the following criteria. When the pressure loss comparison (%) was 110% or more, an evaluation result was "pass", and when the pressure loss comparison (%) was less than 110%, the result was "failure".

Examples 2 to 11

The procedure of Example 1 was repeated except that a shape of grooves, the number of the grooves and the like were changed as shown in Table 1, to prepare honeycomb structures of Examples 2 to 11. Then, a catalyst was loaded onto the surfaces of partition walls of each prepared honeycomb structure. Table 2 shows a catalyst species of the catalyst, and an amount of the catalyst to be loaded.

Comparative Examples 1 to 15

The procedure of Example 1 was repeated except that a shape of grooves, the number of the grooves and the like were changed as shown in Table 3, to prepare honeycomb structures of Comparative Examples 1 to 15. Then, a catalyst was loaded onto the surfaces of partition walls of each prepared honeycomb structure. Table 4 shows a catalyst species of the catalyst, and an amount of the catalyst to be loaded.

As to each of the honeycomb structures of Examples 2 to 11 and Comparative Examples 1 to 15, "a $NO_x$ purification ratio (%)" and "an isostatic strength (MPa)" were evaluated by methods similar to those of Example 1. Furthermore, as to each honeycomb structure, "pressure loss comparison (%)" was evaluated by a method similar to that of Example 1. Table 2 and Table 4 show the results.

TABLE 2

| | Catalyst species | Amount of catalyst to be loaded (g/L) | $NO_x$ purification ratio (%) | Pressure loss comparison (%) | Isostatic strength (MPa) |
|---|---|---|---|---|---|
| Example 1 | Copper zeolite | 175 | 76 | 121 | 2.2 |
| Example 2 | Copper zeolite | 175 | 75 | 123 | 2.1 |
| Example 3 | Copper zeolite | 175 | 77 | 124 | 2.3 |
| Example 4 | Copper zeolite | 175 | 76 | 121 | 2.1 |
| Example 5 | Copper zeolite | 175 | 77 | 122 | 2.4 |
| Example 6 | Copper zeolite | 175 | 79 | 122 | 1.3 |
| Example 7 | Copper zeolite | 175 | 76 | 123 | 2.4 |
| Example 8 | Copper zeolite | 175 | 78 | 120 | 1.6 |
| Example 9 | Copper zeolite | 175 | 77 | 121 | 1.5 |
| Example 10 | Copper zeolite | 175 | 75 | 122 | 2.5 |
| Example 11 | Copper zeolite | 175 | 80 | 124 | 1.2 |

TABLE 3

| | Cell structure | | | No. of grooves per cell (grooves) | Dimension of groove | | | Open frontal area A which does not include grooves (%) | Open frontal area B including grooves (%) | Difference between open frontal area A and open frontal area B (B − A) (%) | Number ratio of cells having grooves (%) |
|---|---|---|---|---|---|---|---|---|---|---|---|
| | Partition wall thickness (mm) | Cell density (cells/cm²) | Porosity (%) | | a (mm) | b (mm) | c (mm) | | | | |
| Comparative Example 1 | 0.132 | 47 | 35 | 0 | — | — | — | 82.8% | — | — | — |
| Comparative Example 2 | 0.114 | 62 | 35 | 0 | — | — | — | 82.8% | — | — | — |
| Comparative Example 3 | 0.089 | 93 | 35 | 0 | — | — | — | 83.6% | — | — | — |
| Comparative Example 4 | 0.089 | 116 | 35 | 0 | — | — | — | 81.7% | — | — | — |
| Comparative Example 5 | 0.064 | 140 | 35 | 0 | — | — | — | 85.6% | — | — | — |
| Comparative Example 6 | 0.114 | 62 | 35 | 5 | 0.51 | 0.25 | 0.04 | 82.8% | 87.5% | 4.7% | 86% |
| Comparative Example 7 | 0.114 | 62 | 35 | 5 | 0.013 | 0.009 | 0.04 | 82.8% | 82.9% | 0.1% | 92% |
| Comparative Example 8 | 0.114 | 62 | 35 | 5 | 0.51 | 0.504 | 0.03 | 82.8% | 87.5% | 4.7% | 96% |
| Comparative Example 9 | 0.114 | 62 | 35 | 5 | 0.24 | 0.008 | 0.05 | 82.8% | 84.7% | 1.9% | 94% |
| Comparative Example 10 | 0.114 | 62 | 35 | 5 | 0.24 | 0.22 | 0.005 | 82.8% | 83.2% | 0.4% | 87% |
| Comparative Example 11 | 0.305 | 31 | 35 | 5 | 0.23 | 0.23 | 0.06 | 68.9% | 71.1% | 2.1% | 89% |
| Comparative Example 12 | 0.114 | 62 | 35 | 5 | 0.016 | 0.01 | 0.02 | 82.8% | 82.9% | 0.08% | 90% |
| Comparative Example 13 | 0.114 | 62 | 35 | 5 | 0.24 | 0.25 | 0.03 | 82.9% | 85.1% | 2.28% | 77% |
| Comparative Example 14 | 0.114 | 62 | 35 | 5 | 0.504 | 0.49 | 0.05 | 82.8% | 90.5% | 7.70% | 94% |
| Comparative Example 15 | 0.114 | 62 | 35 | 0 | — | — | — | 82.8% | — | — | 88% |

TABLE 4

| | Catalyst species | Amount of catalyst to be loaded (g/L) | NOx purification ratio (%) | Pressure loss comparison (%) | Isostatic strength (MPa) |
|---|---|---|---|---|---|
| Comparative Example 1 | Copper zeolite | 150 | 50 | 100 | 4.2 |
| Comparative Example 2 | Copper zeolite | 150 | 55 | 120 | 4.5 |
| Comparative Example 3 | Copper zeolite | 150 | 60 | 150 | 3.8 |
| Comparative Example 4 | Copper zeolite | 150 | 63 | 110 | 3.5 |
| Comparative Example 5 | Copper zeolite | 150 | 64 | 110 | 3.6 |
| Comparative Example 6 | Copper zeolite | 175 | 75 | 120 | 0.8 |
| Comparative Example 7 | Copper zeolite | 175 | 76 | 133 | 4.5 |
| Comparative Example 8 | Copper zeolite | 175 | 77 | 121 | 0.7 |
| Comparative Example 9 | Copper zeolite | 175 | 75 | 134 | 3.2 |
| Comparative Example 10 | Copper zeolite | 175 | 77 | 135 | 3.5 |
| Comparative Example 11 | Copper zeolite | 175 | 75 | 123 | 0.8 |
| Comparative Example 12 | Copper zeolite | 175 | 76 | 134 | 2.8 |
| Comparative Example 13 | Copper zeolite | 175 | 77 | 126 | 1.7 |
| Comparative Example 14 | Copper zeolite | 175 | 75 | 122 | 0.9 |
| Comparative Example 15 | Copper zeolite | 175 | 75 | 139 | 4.5 |

(Result)

In the honeycomb structures of Examples 1 to 11, the $NO_x$ purification ratio was 75% or more and the isostatic strength was 1.0 MPa or more which was a passing criterion. In particular, the isostatic strength indicated an extremely excellent value of 2.1 MPa or more in the honeycomb structures of Examples 1 to 5, 7 and 10. Furthermore, each of the honeycomb structures of Examples 1 to 11 also indicated an excellent value also in the evaluation of "the pressure loss comparison (%)".

The honeycomb structures of Comparative Examples 1 to 5 and 15 did not have grooves in the surfaces of partition walls. In the honeycomb structure of Comparative Example 15, the amount of the catalyst to be loaded was the same as in the honeycomb structures of Examples 1 to 11, and hence, the honeycomb structure exhibited a purification performance of the same degree as in the honeycomb structures of Examples 1 to 11. However, in the honeycomb structure of Comparative Example 15, a value of "the pressure loss comparison (%)" was an extremely high value. Specifically, in the honeycomb structure of Comparative Example 15, the amount of the catalyst to be loaded is excessively large for achievement of a practical use level of pressure loss, and it is necessary to decrease the amount of the catalyst to be loaded.

In the honeycomb structures of Comparative Examples 1 to 5, the amount of the catalyst to be loaded decreased as compared with the honeycomb structure of Examples 1 to 11 and Comparative Example 15. In the honeycomb structures of Comparative Examples 1 to 5, the $NO_x$ purification ratio was extremely low. Furthermore, in the honeycomb structures of Comparative Examples 1 to 5, improvement of the value of "the pressure loss comparison (%)" was partially seen due to adjustment of a partition wall thickness or a cell density of each honeycomb structure, but it was difficult to achieve both of the inhibition of pressure loss rise and the improvement of purification performance.

The honeycomb structures of Comparative Examples 6 to 14 had grooves in the surfaces of partition walls. However, in the honeycomb structures of Comparative Examples 6 to 11, at least one of a groove open width a, a bottom width b and a height c did not satisfy a predetermined value or required conditions. The honeycomb structures of Comparative Examples 6 to 11 did not satisfy a passing criterion in the evaluation of "the isostatic strength (MPa)" or "the pressure loss comparison (%)".

In the honeycomb structures of Comparative Examples 12 to 14, "the difference (%) between the open frontal area A and the open frontal area B" or "the number ratio (%) of the cells having the grooves" did not satisfy a predetermined value, and the honeycomb structures did not satisfy the passing criterion in the evaluation of "the isostatic strength (MPa)" or "the pressure loss comparison (%)".

A honeycomb structure of the present invention is utilizable as a catalyst carrier onto which a catalyst to purify an exhaust gas emitted from a gasoline engine, a diesel engine or the like is to be loaded.

DESCRIPTION OF REFERENCE NUMERALS

1: partition wall, 2: cell, 3: circumferential wall, 4: honeycomb structure body, 5: groove, 11: first end face, 12: second end face, 100, 200, 300 and 400: honeycomb structure, a: open width, b: bottom width, c: height, t: thickness of a partition wall in a portion in which the groove is formed, and t0: thickness of a partition wall in a portion which does not have the groove.

What is claimed is:

1. A honeycomb structure comprising a pillar-shaped honeycomb structure body,
   the honeycomb structure body having porous partition walls arranged to surround a plurality of cells extending from a first end face to a second end face to form through channels for a fluid and a circumferential wall disposed at the circumference of the honeycomb structure body, and
   the honeycomb structure having grooves dented inwardly from surfaces of the partition walls along a direction from the first end face toward the second end face, in the surfaces of the partition walls arranged to surround the plurality of cells,
   wherein in a cross section of the honeycomb structure body which is perpendicular to an extending direction of the plurality of cells,
   an open width a of an open end of each of the grooves in the surfaces of the partition walls is from 0.015 to 0.505 mm,
   a bottom width b of a bottom of each of the grooves is from 0.01 to 05 mm,
   a height c from the bottom of each of the grooves to the open end is from 0.01 to 0.05 mm,
   the open width a of each of the grooves is larger than the bottom width b of each of the grooves,
   the open width a of each of the grooves is smaller than a length of one side of each of the cells surrounded by the partition walls having the grooves,
   a thickness of the partition wall in a portion in which each of the grooves is formed is 50 μm or more, a ratio of the number of the cells surrounded by the partition walls having the grooves to the number of the plurality of cells formed in the honeycomb structure body is 80% or more, and when a ratio of an open frontal area of the plurality of cells in the first end face of the honeycomb structure body excluding an open frontal area of each of the grooves to a total area of the first end face of the honeycomb structure body surrounded by the circumferential wall is A % and a ratio of the open frontal area of the plurality of cells in the first end face of the honeycomb structure body including the open frontal area of each of the grooves to the total area of the first end face of the honeycomb structure body surrounded by the circumferential wall is B %, a value obtained by subtracting the open frontal area A % from the open frontal area B % is from 0.1 to 8.0%.

2. The honeycomb structure according to claim 1,
wherein in the cross section of the honeycomb structure body which is perpendicular to the extending direction of the plurality of cells, a shape of the plurality of cells is polygonal, and
the honeycomb structure has at least one of the grooves in each of the surfaces of the partition walls constituting respective sides of the plurality of cells.

3. The honeycomb structure according to claim 2, having two or more grooves in the surface of the partition wall constituting at least one of the respective sides of the plurality of cells, wherein the two or more grooves are arranged at equal intervals in the surface of the partition wall constituting the at least one of the respective sides.

4. The honeycomb structure according to claim 1,
wherein the thickness of the partition wall in the portion having the groove is from 0.5 times or more as large as a the thickness of the partition wall in a portion which does not have the groove to less than the thickness of the partition wall in the portion which does not have the groove.

5. The honeycomb structure according to claim 2,
wherein the thickness of the partition wall in the portion having the groove is from 0.5 times or more as large as a the thickness of the partition wall in a portion which does not have the groove to less than the thickness of the partition wall in the portion which does not have the groove.

6. The honeycomb structure according to claim 3,
wherein the thickness of the partition wall in the portion having the groove is from 0.5 times or more as large as a the thickness of the partition wall in a portion which does not have the groove to less than the thickness of the partition wall in the portion which does not have the groove.

7. The honeycomb structure according to claim 1,
wherein an exhaust gas purifying catalyst is loaded onto the surfaces of the partition walls, to fill the grooves of the partition walls.

8. The honeycomb structure according to claim 2,
wherein an exhaust gas purifying catalyst is loaded onto the surfaces of the partition walls, to fill the grooves of the partition walls.

9. The honeycomb structure according to claim 3,
wherein an exhaust gas purifying catalyst is loaded onto the surfaces of the partition walls, to fill the grooves of the partition walls.

10. The honeycomb structure according to claim 4,
wherein an exhaust gas purifying catalyst is loaded onto the surfaces of the partition walls, to fill the grooves of the partition walls.

11. The honeycomb structure according to claim 5,
wherein an exhaust gas purifying catalyst is loaded onto the surfaces of the partition walls, to fill the grooves of the partition walls.

12. The honeycomb structure according to claim 6,
wherein an exhaust gas purifying catalyst is loaded onto the surfaces of the partition walls, to fill the grooves of the partition walls.

* * * * *